US005468370A

United States Patent [19]

Ledoux et al.

[11] Patent Number: 5,468,370
[45] Date of Patent: Nov. 21, 1995

[54] PREPARATION OF A CATALYST FROM METAL OXIDES BY REDUCTION AND PARTIAL CARBURIZATION BY REACTION GASES

[75] Inventors: Marc-Jacques Ledoux; Jean-Louis Guille; Cuong Pham Huu, all of Strasbourg; Hugh Dunlop, Egreve; Marie Prin, Moirans, all of France

[73] Assignee: Pechiney Recherche, Courbevoie, France

[21] Appl. No.: 162,293

[22] Filed: Dec. 7, 1993

Related U.S. Application Data

[63] Continuation-in-part of Ser. No. 933,933, Aug. 24, 1992, abandoned.

[30] Foreign Application Priority Data

Sep. 6, 1991 [FR]  France ................................. 91 12374

[51] Int. Cl.$^6$ .......................... C10G 35/06; B01J 27/22; B01J 37/18
[52] U.S. Cl. .......................... 208/134; 585/420; 585/477; 502/177
[58] Field of Search ............................. 502/177; 208/134; 585/420, 477

[56] References Cited

U.S. PATENT DOCUMENTS

| 2,560,345 | 7/1951 | Hemminger | 502/177 |
| 2,755,228 | 7/1956 | Anhorn et al. | 208/134 |
| 4,271,041 | 6/1981 | Boudart et al. | 502/177 |
| 4,326,992 | 4/1982 | Slaugh et al. | 502/177 |
| 4,331,544 | 5/1982 | Takaya et al. | 502/177 |
| 4,515,763 | 5/1985 | Boudart et al. | 423/440 |
| 5,139,987 | 8/1992 | Ledoux et al. | 502/177 |

*Primary Examiner*—Sharon Gibson
*Assistant Examiner*—Walter D. Griffin
*Attorney, Agent, or Firm*—Dennison, Meserole, Pollack & Scheiner

[57] ABSTRACT

A catalyst for chemical and petrochemical reactions and a process for its production. The catalyst comprises an oxide of one of the transition metals, rare earth elements, or actinide elements, e.g., molybdenum, having on its surface carbides and oxycarbides, the core being the metal or the metal oxide. In the process for catalyst production, the reaction gas mixture containing carbon products is passed onto the oxide, leading to a progressive carburization of the surface of the oxide and to a progressive increase in the efficiency of the catalyst.

22 Claims, No Drawings

PREPARATION OF A CATALYST FROM METAL OXIDES BY REDUCTION AND PARTIAL CARBURIZATION BY REACTION GASES

CROSS REFERENCE TO RELATED APPLICATIONS:

This application is a continuation-in-part of application Ser. No. 07/933,933, filed Aug. 24, 1992, now abandoned.

BACKGROUND OF THE INVENTION

1. Field of the Invention

The invention relates to a process for the preparation of a chemical or petrochemical reaction catalyst, constituted by an oxide of heavy metals having on the surface the metal carbides and oxycarbides with a large specific surface. This catalyst is particularly suitable for the refining and transformation of petroleum products and in particular for reforming. The invention also relates to the catalyst obtained by this process.

2. Description of the Related Art

French patent application 89 04433 (Pechiney Electrometallurgie) describes a process for the production of carbides of heavy metals with a large specific surface for use as catalysts in the petrochemical industry. These carbides are obtained by reacting at a relatively high temperature on a carbon with a large specific surface, a volatile compound of the heavy metal, whose carbide it is wished to obtain. Thus, to a certain extent the carbide retains the memory of the specific surface of the starting carbide and retains a larger active surface than the prior art carbides, which makes it readily usable as a catalyst.

Subsequent research carried out by the same team of scientists has revealed the essential function played in the catalytic mechanism by the oxycarbides present on the surface and identified by X-ray photoelectron spectroscopy (XPS) analysis. French patent application 90 11633 (GIE Pechiney Recherche) thus describes an oxidation treatment performed at a temperature of approximately 300° C. on metal carbides prepared according to the aforementioned application and which makes it possible to obtain said oxycarbides, which are responsible for most catalytic activity. This treatment must be followed by a reactivation period at 350° C. in a hydrocarbon-hydrogen mixture, which is generally the mixture which is to be isomerized in the reforming operations.

U.S. Pat. No. 4,515,763 (Boudart) also describes a process for the production of carbides and nitrides of heavy metals, including molybdenum and vanadium intended for catalysis. This process is based on a principle opposite to that of French patent application 89 04433, because in this case a carburizing gas, generally methane, diluted in hydrogen is reacted on the solid metal oxide. The process also involves a precise temperature rise cycle between 768° and 100° K., a relatively high hydrocarbon concentration of at least 10% by volume, quenching once carburization is complete and preferably a very cautious passivation treatment in a weakly oxidizing gas, the product obtained being pyrophoric in contact with air, due to the fact that it is prepared in a highly reducing medium.

SUMMARY OF THE INVENTION

By XPS analysis on catalysts based on molybdenum carbide, but also vanadium and tungsten carbide after being treated in air at 300° C. and then reactivated under a hydrocarbon-hydrogen mixture at 350° C., an oxycarbide phase responsible for the catalytic activity was found. The inventors asked the question as to whether it can be directly obtained by a reaction at low temperature between on the one hand the mixture to be reformed, e.g. n-hexane/hydrogen and on the other molybdenum trioxide $MoO_3$. If the question can be answered in the affirmative, it leads to a significant simplification to the process, because the active part of the catalyst is prepared in situ, in the presence of the reaction medium and this obviates handling precautions with respect to the product sensitive to external agents and constituting a catalyst.

However, the teaching of the Boudart patent hardly made it possible to hope for a positive answer. It firstly aims at the integral transformation of the oxide into carbide, whereas the aim of the present invention is a mixed carbide-oxycarbide layer on the surface of the oxide. Moreover, the temperatures are higher, the heating cycle is very clearly defined and a quenching is necessary at the end of the treatment. Finally, the use of hydrocarbons heavier than methane is discourage therein, because they are liable to from surface carbon aggregates.

DETAILED DESCRIPTION OF THE INVENTION

The invention relates to a catalyst usable in chemistry and petrochemistry for the chemical transformation of a reaction gas mixture containing at least one carbon compound, the catalyst being constituted by a core of an oxide of a transition metal (3b, 4b, 5b, 6b, 7b, 8 of series, 4, 5, 6 of the periodic classification of elements), a rare earth element or an actinide element, covered with a surface layer of an oxycarbide of the metal in question in equilibrium with the carbide and oxide. The invention also relates to the process for producing such a catalyst, which is characterized in that the surface carbide-oxide-oxycarbide layer is developed by reduction and carburization of the oxide by the reaction gas mixture, which is passed on to the oxide under the conditions of the catalyzed chemical transformation pressure, temperature and composition.

In a variant of the above catalyst, instead of the core being constituted by an oxide, it is constituted by metal covered with an oxide layer, which is itself covered by a surface layer of a mixture of carbide, oxide and oxycarbide of the metal in question.

The production process for the catalyst according to the above variant is characterized in that the metal is first covered by an oxide layer using an appropriate oxidation treatment and in that the surface carbide-oxide-oxycarbide layer is then developed by reduction and carburization of the oxide layer by the reaction gas mixture, which is passed on to the oxide under catalyzed chemical transformation pressure, temperature and composition conditions.

Finally, the invention relates to the use of catalysts having a particular structure obtained by the process for the purpose of reforming hydrocarbons.

The invention can be carried out very easily. For the production of catalysts with an oxide core, use is made of the oxide of the metal in question in powder or granule form. For example, the oxide can be placed in a reactor under a flow of the gaseous mixture to be reformed and raised to the reforming temperature. For the production of catalysts having a metal core, the oxide layer is developed by an oxidizing treatment of the metal powder in a flow of air or gas containing oxygen at a temperature varying as a function of the metal, but usually between 300° and 450° C. for a period of 3 to 15 hours.

The thus surface oxidized powder is then placed in the reactor under the flow of the gaseous mixture to be reformed and is heated to the reforming temperature.

Preferably, prior to the oxidizing treatment, the metal powder is treated under a hydrogen flow in order to reduce the surface absorbed impurities. This treatment takes place at a temperature between 600° and 800° C. for 1 to 2 hours.

The examples given hereinafter relate to molybdenum trioxide $MoO_3$, but without passing outside the scope of the invention, it is possible to use oxides of transition metals, rare earths or actinides, with which comparable results can be obtained.

EXAMPLE 1

In this example, the product to be reformed is n-hexane diluted in hydrogen. The partial pressure of n-hexane is 5 mm of mercury (666.6 Pa). As the total pressure in the reactor is atmospheric pressure, the volume percentage of n-hexane in the mixture is approximately 5/760=0.66%. The total gaseous flow rate is 40 cm³/min. The $MoO_3$ quantity is 200.5 mg and the reaction temperature is 350° C.

Table 1 gives the results obtained as a function of time. In this table, the time elapsed since the start of the operation appears at the top of the columns. The lines successively indicate the conversion rate as a percentage of the molecules of n-hexane transformed either by isomerization, or by cracking, the selectivity as a percentage of isomerized molecules compared with all the transformed molecules and the percentages of the isomerized chemical species related to the total of the isomers obtained:

DM-2, 2B=2,2-dimethyl butane+2,3-dimethyl butane

M2P=2-methyl pentane

M3P=3-methyl pentane

MCP=methyl cyclopentane

BEN+CYC=benzene+cyclohexane.

It should be noted that the values of the DM-2, 2B line also include the contents of IM-2, 3B, i.e. 2,3-dimethyl butane.

The lines also indicate the percentages of the cracked chemical species obtained related to the total of the cracked products obtained.

be made:

1) The number of n-hexane molecules transformed is zero during the first hour of reaction (conversion=0). After approximately two hours under n-hexane flow at 350° C., it can be seen that the catalyst starts to become active, which leads to a significant modification of its surface. This modification corresponds to a reduction of the inactive valency 6 oxide into its suboxides and which in turn are transformed into reactive oxycarbides by reaction with the reaction mixture (n-hexane/hydrogen).

2) The $C_6$ isomer selectivity is also modified as a function of the time and passes from 59 to 80%.

These observations make it possible to formulate the following hypothesis for explaining the behaviour of the catalyst.

The first period (approximately between 0 and 2 hours of reaction) during which the catalyst is not active can be attributed to a rapid reduction stage of the oxide $MoO_3$ into its suboxide $MoO_2$ by the reacting mixture. The activity measured after 1 hour of reaction is zero, because $MoO_3$ remains as the majority product, as is shown by the X-ray diagram, which is identical to that of the starting oxide. However, the light grey, valency 6 starting molybdenum oxide has, after 1 hour of reaction, turned dark blue-grey, which represents a partial reduction of the surface oxide, which cannot be detected with X-rays. After 2 hours reaction, the $MoO_3$ still remains the majority compound of the catalyst, but in the X-ray diagram it is now possible to see two new phases constituted by $MoO_2$ and $Mo_2C$ or $Mo_2O_xC_y$ (oxycarbide which the X-rays are unable to distinguish from the carbide.

The second period during which the reactivity of the catalyst is highly increased (between 2 and 8 hours reaction at 350° C.) is attributed to a progressive transformation of $McO_2$ into a new oxycarbide species by the incorporation of a carbon atom in the oxide system. This hypothesis is supported by the X-ray diagram on catalyst samples taken at successive times during the reaction. These show that the $MoO_2$ phase after 3 hours reaction has become the majority phase to the detriment of the $MoO_3$ phase, which has virtually disappeared. However, the relative proportion of the carbide or oxycarbide phase (no distinction being possible in X-ray diffraction) increases in proportion to the duration of the reaction, which coincides perfectly with the

TABLE 1

| Time (h) | 1.0 | 1.5 | 3.0 | 4.0 | 8.0 | 9.0 | 24.0 | 31.5 | 48.0 | 51.0 | 53.0 |
|---|---|---|---|---|---|---|---|---|---|---|---|
| Conversion (%) | 0 | 3.16 | 38.36 | 51.32 | 71.48 | 68.79 | 71.57 | 73.02 | 59.76 | 68.96 | 70.00 |
| Selectivity C6 (%) | 59 | 64 | 62 | 63 | 66 | 77 | 77 | 83 | 80 | 80 | |
| Selectivity of the reaction products (%) | | | | | | | | | | | |
| DM-2, 2B | | 1.2 | 3.0 | 3.3 | 4.1 | 3.9 | 4.4 | 4.9 | 3.5 | 4.3 | 4.3 |
| M2P | | 53.6 | 61.6 | 60.7 | 59.4 | 59.9 | 59.4 | 58.7 | 60.7 | 58.9 | 59.6 |
| M3P | | 30.6 | 32.1 | 32.8 | 33.4 | 33.3 | 34.1 | 34.3 | 34.1 | 34.7 | 34.1 |
| MCP | | 14.5 | 2.0 | 1.6 | 1.2 | 1.2 | 0.9 | 0.9 | 0.9 | 0.9 | 0.9 |
| BEN + CYC | | 0 | 1.3 | 1.5 | 1.9 | 1.7 | 1.2 | 1.2 | 0.8 | 1.1 | 1.1 |
| C5 + C1 | | 12 | 10 | 11 | 15 | 14 | 24 | 24 | 24 | 27 | 28 |
| C4 + C2 | | 19 | 18 | 18 | 20 | 20 | 25 | 26 | 26 | 29 | 29 |
| 2 C3 | | 67 | 72 | 71 | 65 | 66 | 50.5 | 49 | 48.5 | 43.0 | 42 |
| 3 C2 | | 1 | 0 | 0 | 0 | 0 | 0.5 | 1 | 1.1 | 0.8 | 1 |
| 6 C1 | | 0 | 0 | 0 | 0 | 0 | 0 | 0 | 0.4 | 0.2 | 0 |

Examination of the table enables the following comments to be made:

increase in the conversion rate observed.

Another observation based on the X-ray diagrams makes it possible to confirm that the active phase is indeed the carbide or oxycarbide phase and not the oxide $MoO_2$. After 3 hours reactivity, $MoO_2$ is virtually the only majority compound in the catalyst. However, the reactivity of the catalyst continues to increase strongly as a function of time, which shows that the active phase responsible for the isomerization is not $MoO_2$, because then the reactivity maximum would be reached as soon as $MoO_2$ became preponderant, i.e. after roughly 3 hours.

During that second period, the catalyst reaches a stabilization stage between the surface oxide, carbide and the oxycarbide phases and the conversion rate remains unchanged. However, the $C_6$ isomer selectivity remains low (approximately 60%). This low selectivity can be explained by the fact that the active surface of the catalyst is influenced by the composition of the deeper layers, which are very rich in oxygen. These oxygen-rich layers induce an "acid" cracking of the reagent into $C_3$ product. Thus, in the carbide-based catalyst, there is a surface phase (a few layers) constituted by oxide and oxycarbide in equilibrium and a core carbide phase. However, in the case of an oxide-based catalyst, there is an oxycarbide phase in equilibrium with oxide and carbide phases, supported and influenced by an oxide core very rich in oxygen.

After approximately 8 hours reaction, the n-hexane conversion rate remains stable as a function of time. However, the $C_6$ isomer selectivity progressively increases to reach 80% at the end of about 30 hours under the reaction flow. The evolution of the selectivity can be explained in the following way. As the reaction advances, there is an exchange between the carbon atoms of the surface and the underlying layers and the oxygen atoms of the deeper layers. This exchange contributes to reducing the influence of the oxide on the reactive surface oxycarbide phase and thus makes it possible to improve the $C_6$ isomer selectivity.

EXAMPLE 2

The starting product for this example was a metallic molybdenum powder with a grain size between 50 and 80 μm. This powder was first treated under a hydrogen flow for 2 hours at 600° C. and then oxidized under an air flow at 350° C. for 14 hours. The catalyst was cooled to ambient temperature, still under an air flow. A mixture of n-hexane and hydrogen having the same composition and under the same conditions as those of Example 1 was supplied to the catalyst. The results are given in Table 2, using the same notations as in Table 1.

TABLE 2

| Time (h) | 3 | 4 | 5 | 6 |
|---|---|---|---|---|
| Conversion (%) | 39 | 35 | 39 | 38 |
| Selectivity C6 (%) | 92 | 93 | 93 | 93 |
| Selectivity of the reaction products (%) | | | | |
| $C_6$ isomer selectivity (%) | | | | |
| DM-2, 2B | 2.1 | 2 | 2 | 2 |
| M2P | 63.1 | 63.8 | 63.2 | 63 |
| H3P | 33.4 | 32.8 | 33.7 | 33.9 |
| MCP | 0.8 | 0.9 | 0.7 | 0.7 |
| BEN + CYC | 0.5 | 0.5 | 0.5 | 0.5 |
| Selectivity of the cracking products (%) | | | | |
| C5 + C1 | 30 | 28 | 32 | 31 |
| C4 + C2 | 32 | 32 | 35 | 35 |
| 2C3 | 38 | 40 | 33 | 34 |
| 3C2 | 0 | 0 | 0 | 0 |

TABLE 2-continued

| 6C1 | 0 | 0 | 0 | 0 |
|---|---|---|---|---| by comparison with example 1, it can be seen that the conversion rate is lower, but the selectivity is better.

EXAMPLE 3

In this example a comparison was made of the specific velocities of the $Mo_2C$-based catalysts prepared according to the process of French patent application 89 04433 and activated by an oxidizing treatment according to the process of French patent application 90 11633 and those of the catalysts according to the present invention.

200 mg of $Mo_2C$ are oxidized after an air flow at 350° C. and for 14 hours, followed by reactivation under a mixture of n-hexane and hydrogen at 350° C. for 7 hours. The thus activated catalyst is transported under hydrogen into a glove box for weighing and fractionation into amounts of 10 mg used for a series of tests with a low conversion rate (between 10 and 20% ). The $MoO_3$ oxide-based catalyst is directly activated according to the process of the invention at 350° C. under a n-hexane/hydrogen flow and without any oxdizing treatment in air, the remainder of the operating procedure being identical to that used for the molybdenum carbide-based catalysts.

The specific velocity, which is a measure of the activity of the catalyst, is calculated by the following formula:

$$r=T\cdot(F/m)$$

in which r: specific velocity in mole/g/s

T: conversion rate in %

F: reagent flow in mole/s m: catalyst weight in g.

The comparative measurements carried out on the two types of catalyst show that the catalyst form from molybdenum oxide has a specific velocity of $32000 \cdot 10^{-10}$ mole/g.s against values 4800 and $14000 \cdot 10^{-10}$ mole/g.s, as a function of their specific surface, for molybdenum carbide-based catalysts.

It would therefore appear that specific velocity of oxide-based catalysts is much higher than that of carbide-based catalysts. Conversely, the selectivity of the oxide-based catalysts, namely 90% with a low conversion rate and 80% with a high conversion rate, is below that observed with carbide-based catalysts, where it is 93 to 94% with a low conversion rate and 87 to 92% with a high conversion rate.

What is claimed is:

1. Process for the in-situ production of a catalyst for reforming or isomerizing a reaction gas mixture containing hydrogen and at least one hydrocarbon, comprising the steps of:

a) providing particles of an oxide of a transition metal element; and b) exposing said particles to said reaction gas mixture under conditions of temperature, pressure and reaction gas mixture composition sufficient for catalysis of said reforming or isomerizing, such that a catalyst is formed comprising a core of particles of said oxide, which core is covered with a surface layer comprising an oxycarbide of said element in equilibrium with an oxide and a carbide of said element under said conditions.

2. Process for the in-situ production of a catalyst for reforming or isomerizing of a reaction gas mixture containing hydrogen and at least one hydrocarbon, comprising the steps of:

a) providing particles of a transition metal element;

b) subjecting said particles to an oxidation treatment to form an oxide surface layer on said particles, and c) exposing said oxide surface layer to said reaction gas mixture under conditions of temperature, pressure and reaction gas mixture composition sufficient for catalysis of said reforming or isomerizing, such that a catalyst is formed comprising a core of particles of said element, which core is covered by an intermediate layer of an oxide of said element and an outer layer comprising an oxycarbide of said element in equilibrium with an oxide and a carbide of said element under said conditions.

3. Process according to claim 2, wherein the oxidation treatment comprises oxidizing the metal in an air or gas flow containing oxygen at a temperature between 300° and 450° C. for between 3 and 15 hours.

4. Process according to claim 2, additionally comprising subjecting said particles to a treatment under a hydrogen flow at a temperature between 600° and 800° C. for 1 to 2 hours, before said oxidation treatment.

5. Process according to claim 3, additionally comprising subjecting said particles to a treatment under a hydrogen flow at a temperature between 600° and 800° C. for 1 to 2 hours, before said oxidation treatment.

6. Process according to claim 1, wherein the oxide of said element is molybdenum trioxide $MoO_3$.

7. Process according to claim 2, wherein the oxide of said element is molybdenum trioxide $MoO_3$.

8. Process according to claim 1, wherein the reaction gas mixture comprises hydrogen and a hydrocarbon.

9. Process according to claim 2, wherein the reaction gas mixture comprises hydrogen and a hydrocarbon.

10. Process according to claim 8, wherein the reaction gas mixture comprises hydrogen and n-hexane.

11. Process according to claim 9, wherein the reaction gas mixture comprises hydrogen and n-hexane.

12. Catalyst for reforming or isomerizing a reaction gas mixture containing at least one hydrocarbon, comprising a core of an oxide of a transition metal element, covered by a surface layer comprising an oxycarbide of the element in equilibrium with an oxide and a carbide of the element, said catalyst formed by exposing said core to said reaction gas mixture under conditions of temperature, pressure, and reaction gas mixture composition sufficient for catalysis of said reforming or isomerizing and to produce said equilibrium.

13. Catalyst for reforming or isomerizing a reaction gas mixture containing at least one hydrocarbon, comprising a core of a transition metal element, covered by an intermediate layer of an oxide of said element, and a surface layer comprising an oxycarbide of the element in equilibrium with an oxide and a carbide of the element, said catalyst formed by exposing said intermediate oxide layer to said reaction gas mixture under conditions of temperature, pressure, and reaction gas mixture composition sufficient for catalysis of said reforming or isomerizing and to produce said equilibrium.

14. Catalyst according to claim 12, wherein said core comprises molybdenum oxide $MoO_2$.

15. Catalyst according to claim 13, wherein said core comprises molybdenum.

16. Process for reforming or isomerizing a reaction gas mixture comprising hydrogen and at least one hydrocarbon, comprising the steps of:

a) providing particles of an oxide of a transition metal element;

b) exposing said particles to said reaction gas mixture under conditions of temperature, pressure and reaction gas mixture composition sufficient for catalysis of said reforming or isomerizing, such that a catalyst is formed comprising a core of particles of said oxide, which core is covered with a surface layer comprising an oxycarbide of said element in equilibrium with a carbide and an oxide of said element; and c) allowing a reforming or isomerizing reaction to proceed under said conditions of temperature, pressure and composition, and catalyzed by said catalyst.

17. Process for reforming or isomerizing a reaction gas mixture comprising hydrogen and at least one hydrocarbon, comprising the steps of:

a) providing particles of a transition metal element;

b) subjecting said particles to an oxidation treatment to form an oxide surface layer on said particles;

c) exposing said oxide surface layer to said reaction gas mixture under conditions of temperature, pressure and reaction gas mixture composition sufficient for catalysis of said reforming or isomerizing, such that a catalyst is formed comprising a core of particles of said element, which core is covered by an intermediate layer of an oxide of said element and an outer layer comprising an oxycarbide of said element in equilibrium with an oxide and a carbide of said element; and d) allowing a reforming or isomerizing reaction to proceed under said conditions of temperature, pressure and composition, and catalyzed by said catalyst.

18. Process according to claim 1, wherein the temperature of said exposing step is about 350° C.

19. Process according to claim 2, wherein the temperature of said exposing step is about 350° C.

20. Process according to claim 16, wherein the temperature of said exposing step is about 350° C.

21. Process according to claim 17, wherein the temperature of said exposing step is about 350° C.

22. Process according to claim 1, wherein said particles consist essentially of said oxide.

\* \* \* \* \*